（12） United States Patent
Allalouf et al.

(10) Patent No.: US 8,503,298 B2
(45) Date of Patent: Aug. 6, 2013

(54) APPLYING QUALITY AWARE VOLUME REDUCTION TO COMMUNICATION NETWORKS

(75) Inventors: Miriam Allalouf, Mevaseret-Zion (IL); Gidon Gershinsky, Haifa (IL); Liane Lewin-Eytan, Binyamina (IL); Joseph Erwin Naor, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/114,075

(22) Filed: May 24, 2011

(65) Prior Publication Data
US 2012/0300627 A1    Nov. 29, 2012

(51) Int. Cl.
H04J 1/16    (2006.01)

(52) U.S. Cl.
USPC ........ 370/230.1; 370/231; 370/232; 370/234; 370/235

(58) Field of Classification Search
USPC ............... 370/230–240, 253, 255, 395.21, 370/395.4–395.43, 468; 709/232–235, 241, 709/242
See application file for complete search history.

(56) References Cited

U.S. PATENT DOCUMENTS

| | | | | |
|---|---|---|---|---|
| 7,151,762 | B1 * | 12/2006 | Ho et al. | 370/338 |
| 7,151,781 | B2 * | 12/2006 | MeLampy et al. | 370/468 |
| 7,746,899 | B2 * | 6/2010 | Kim | 370/468 |
| 2003/0081626 | A1 * | 5/2003 | Naor et al. | 370/431 |

* cited by examiner

*Primary Examiner* — Mark Rinehart
*Assistant Examiner* — Mang Yeung

(57) ABSTRACT

A method of applying a quality-aware volume reduction to communication networks is provided herein. The method includes the following stages: deriving, from the network: a bandwidth capacity limit of the links of the network, and an initial flow rate for each flow transmitted via nodes through the network; obtaining from each one of the nodes, a gain value which corresponds to a quantitative data demand requested by the node and given in terms of data quality; and calculating, for each one of the nodes, a data reduction ratio, that achieves: (i) a maximal overall revenue associated with the network, wherein the revenue for a node is calculated with respect to the quality of the data that arrives to the node, and (ii) an optimal bandwidth allocation over the links with respect to the gains and the data quality at each node, and to the limited bandwidth capacity of the links.

24 Claims, 5 Drawing Sheets

*200*

210 — DERIVING, FROM A COMMUNICATION NETWORK THAT CONTAINS: ONE OR MORE SOURCES, NODES, AND ONE OR MORE TARGETS, ALL CONNECTED VIA DIRECTED LINKS:

(i) A BANDWIDTH CAPACITY LIMIT ASSOCIATED WITH EACH ONE OF THE LINKS, AND (ii) AN INITIAL FLOW RATE THAT IS TRANSMITTED BY THE SOURCES TOWARDS THE TARGETS VIA THE NODES

220 — OBTAINING AS AN INPUT, FROM EACH ONE OF THE NODES, A GAIN VALUE WHICH CORRESPONDS TO A QUANTITATIVE DATA DEMAND REQUESTED BY THE NODE, AND FOR EACH FLOW PASSING THROUGH THE NODE WHEREIN THE QUANTITATIVE DATA DEMAND IS GIVEN IN TERMS OF DATA QUALITY AND RELATES TO DATA THAT ARRIVES TO THE NODE

230 — CALCULATING, FOR EACH ONE OF THE NODES, AND FOR EACH FLOW PASSING THROUGH THE NODE A DATA REDUCTION RATIO, SUCH THAT IT ACHIEVES, WHEN APPLIED TO THE NETWORK THE FOLLOWING:

(I) A MAXIMAL OVERALL REVENUE ASSOCIATED WITH THE COMMUNICATION NETWORK, WHEREIN THE REVENUE FOR A SPECIFIC NODE IS CALCULATED WITH RESPECT TO THE QUALITY OF THE DATA THAT ARRIVES TO THE SPECIFIC NODE, AND (II) AN OPTIMAL BANDWIDTH ALLOCATION OVER THE LINKS WITH RESPECT TO THE GAINS AND THE DATA QUALITY AT EACH NODE, AND FURTHER WITH RESPECT TO THE LIMITED BANDWIDTH CAPACITY OF THE LINKS

Figure 2

APPLYING QUALITY AWARE VOLUME REDUCTION TO COMMUNICATION NETWORKS

BACKGROUND

1. Technical Field

The present invention relates to volume reduction in communication networks and more particularly, to a volume reduction that takes into account the quality of the data flowing through the communication network.

2. Discussion of the Related Art

Communication networks usually include sources of the data such as meters and sensor, nodes connecting the physical links, and targets to which the data finally reaches. In modern communication networks (e.g., smart grids), some of the nodes constituting the network, may either consume or transform some of the data flowing through them. As in traditional networks, bandwidth capacity of the physical links imposes a strict constraint on the data flowing in the network. Volume reduction is usually necessary in order to meet the infrastructural constraints. Additionally, other constrains such as data priority and latency lead to various volume reduction policies.

Volume reduction in currently available communication networks focuses on determining the appropriate initial flow rate at the source, under the assumption that by controlling the data flow rate at its source, all the constraints along the flow from the source to the target, will be adequately met. This approach leads to constant data rates along the flows which is less than optimal in many cases where the nodes along the flow may either consume some of the data or transform it to a different format. As is the case in modern communication network, the quality of the data, which may be different for each node, may serve as an important parameter in determining volume reduction in order to reach optimal allocation of the physical infrastructure of the communication network.

Thus, smart grids create a new traffic engineering challenge. On one hand, massive data flows are originated, requiring a volume reduction process in order to be transmitted over the network. Naturally, the volume of a stream will decrease the accuracy of its data. On the other hand, intermediate nodes run applications that require a certain quality of the data. Thus, the volume reduction carried out over the network should take into consideration both network resources and application data quality requirements. As discussed above, these requirements stand in contrast to traditional traffic design models that assume each flow is allocated a single fixed rate, as constrained by bottleneck link capacities. Currently, no traffic planning solution is known to address objectives regarding to both network utilization and application-aware volume reduction.

BRIEF SUMMARY

One aspect of the invention provides a method of applying a quality-aware volume reduction to communication networks. The method includes the following stages: deriving, from a communication network that contains: one or more sources, nodes, and one or more targets, all connected via directed links: a bandwidth capacity limit associated with each one of the links, and an initial flow rate that is transmitted by the sources towards the targets via the nodes; obtaining as an input, from each one of the nodes, a gain value which corresponds to a quantitative data demand requested by the node, wherein the quantitative data demand is given in terms of data quality and relates to data that arrives to the node; and calculating, for each one of the nodes, a data reduction ratio, such that the data reduction ratio achieves, when applied to the communication network: (i) a maximal overall revenue associated with the communication network, wherein the revenue for a specific node is calculated with respect to the quality of the data that arrives to the specific node, and (ii) an optimal bandwidth allocation over the links with respect to the gains and the data quality at each node, and further with respect to the limited bandwidth capacity of the links.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 2 is a high level flowchart illustrating an exemplary method according to some embodiments of the invention;

Figure 1:
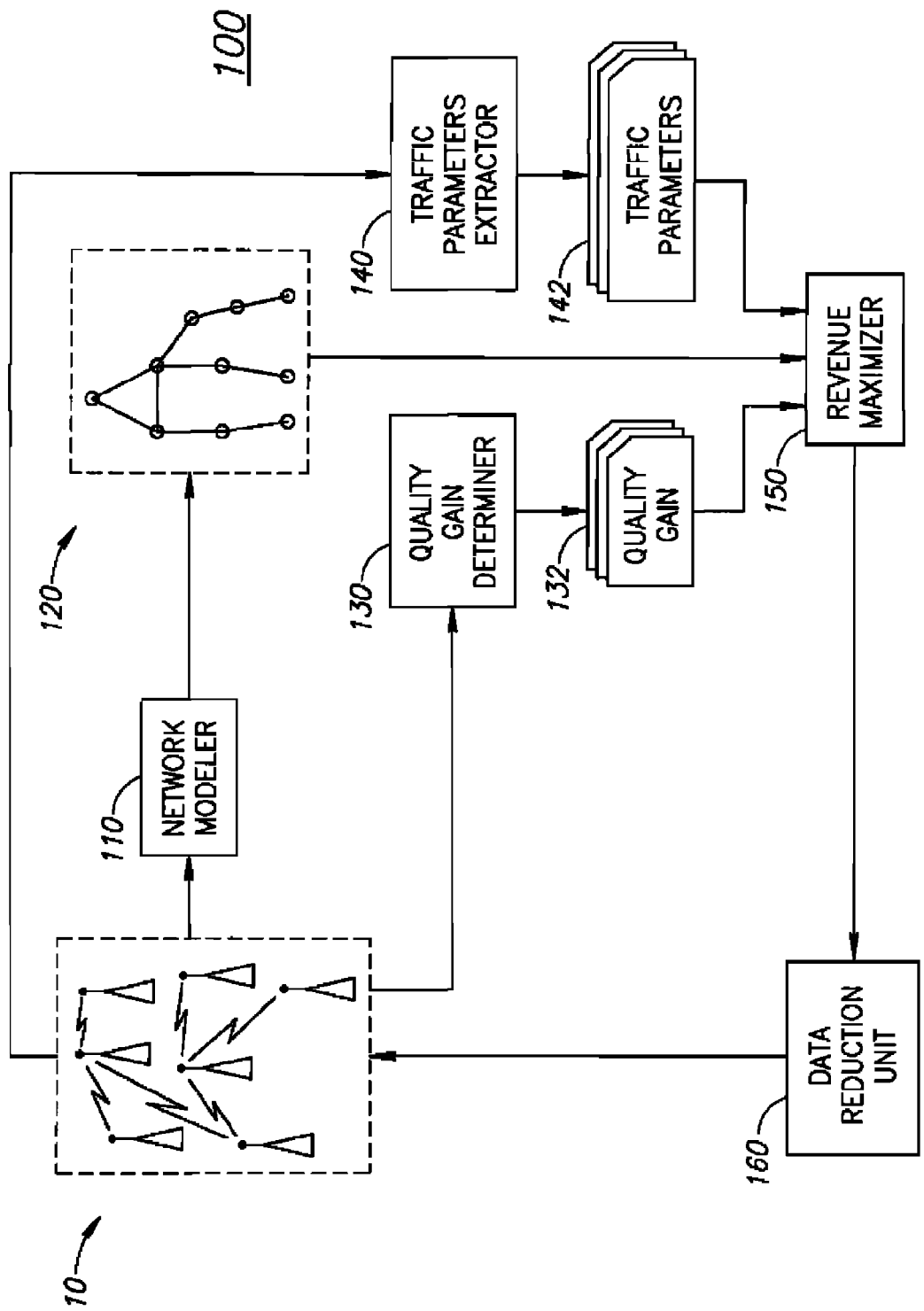
FIG. 1 is a high level schematic block diagram illustrating an exemplary system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "communication network" as used herein in this application refers to any network that includes sources of data that flows through communication links via intermediate nodes into targets. It is noted that the communication network may or may not be hierarchical.

The term "flow" as used herein in this application refers to a specified portion of data from source in the network to a target, via intermediate nodes. The sequenxe of the intermediate nodes define the path of the flow within the network. Along its path, some of the data me be reduced, but no data is added on that flow.

The term "data quality" as used herein in this application refers to a property of data which relates to the nature of informational benefit that may be derived from the data.

The term "quality gain" or "gain" as used herein in this application refers to data requirements of a node (or an application residing on that node) in terms of data quality (i.e. a qualitative rather than quantitative requirement). The gain value is given per flow per node so that each node may have a specific demand of data quality with respect to each one of the flows.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating a possible implementation of a system according to some embodiments of the invention. System 100 may include a modeler 110 configured to generate a model 120 of communication network 10. Communication network 10 may include one or more sources, nodes, and one or more targets. The nodes are all connected via directed links being physical communication channels. Advantages of the present invention may be more apparent in communication networks in which at least some of the nodes are consumers of at least some of the data flowing through them. Model 120, may provide the topology of communication network 10 defined by the sources, nodes and targets and the links interconnecting them. The topology also includes the capacity of each link. The modeling may be used to facilitate the calculations carried out by embodiments of the present invention. Alternatively, the topology of the network may be derived directly from communication network 10. Possibly, model 120 may be in the form of a directed acyclic graph. System 100 may further include a traffic parameters extractor 140 configured to extract traffic parameters 142, from a communication network 10. Traffic parameters 142 extracted by traffic parameters extractor 140 may include: a list of flows and their paths, wherein each one of the flows is associated with an identified source and target nodes and an initial flow rate that is transmitted by its source towards the targets via the nodes.

Additionally, system 100 may further include a quality gain determiner 130 configured to obtain in a form of an input from network 10 and for each one of the nodes, a gain value 132 which corresponds to a quantitative data demand requested by the node. The quality gain is provided in a form of a pair as it assigns a gain value per flow per node. Specifically, the quantitative data demand is given in terms of data quality and relates to data that arrives from a specific flow to the specific node.

System 100 may further include a revenue maximizer 150 which is configured to calculate, for each one of the nodes, a data reduction ratio. Advantageously, revenue maximizer 150 may be operated at the network design and re-design phases and in an off-line mode when there is no traffic running in the network and under the assumption that all flows are known beforehand. Specifically, the data reduction ratio is calculated such that it achieves, when applied to the communication network the following two goals: first, the volume reduction achieves maximal overall revenue associated with the communication network, wherein the revenue for a specific node is calculated with respect to the quality of the data that arrives to the specific node. Second, the volume reduction achieves an optimal bandwidth allocation over the links with respect to the gains from the data quality at each node, and further with respect to the limited bandwidth capacity of the links A data reduction unit 160 may be further included in system 100, to illustrate the deployment stage where the per-node per-flow data reduction values calculated by revenue maximizer 150 are applied to the system. In an exemplary embodiment, data reduction unit 160 receives as an input from revenue maximizer 150 a set of ratios, a ratio for each node of communication network 10, and for each flow passing through the node. Data reduction unit 160 then uses the ratios to determine the amount of data that need to be reduced from each one of the nodes. The actual data reduction mechanism is beyond the scope of the present invention and it is noted that various data reduction methods known in the art may be used effectively.

FIG. 2 is a high level flowchart illustrating a method 200 according to some embodiments of the invention. It is understood that method 200 is not necessarily implemented by the aforementioned architecture of system 100 and other hardware or software implementations may be used. Method 200 starts off with the stage of deriving, from a communication network that contains: one or more sources, nodes, and one or more targets, all connected via directed links: a bandwidth capacity limit associated with each one of the links, and an initial flow rate that is transmitted by the sources towards the targets via the nodes 210. The method goes on (or performs concurrently) to the stage of obtaining as an input, from each one of the nodes and for each flow passing through the node, a gain value which corresponds to a quantitative data demand requested by the node with respect to each flow, wherein the quantitative data demand is given in terms of data quality and relates to data that arrives to the node 220 from the respective flows. Finally, the method proceeds to the stage of calculating 230, for each one of the nodes and for each flow passing through the node, a data reduction ratio, such that the data reduction ratio achieves, when applied to the communication network: (i) a maximal overall revenue associated with the communication network, wherein the revenue for a specific node is calculated with respect to the quality of the data that arrives to the specific node from each flow passing through the node, and (ii) an optimal bandwidth allocation over the links with respect to the gains from the data quality at each node, and further with respect to the limited bandwidth capacity of the links.

Consistent with some embodiments of the present invention, for each one of the nodes, the revenue per flow is calculated as a product of the data quality and its respective gain value. It is understood that other calculation may be carried out to represent revenue. However, some form of multiplication of quality and gain is intuitive for the calculation of revenue and so multiplication may be commonly used.

The optimal bandwidth allocation is carried out by allocating for all the flows different rates to various sections of a flow along its path, following the volume reductions performed over the flow by different nodes along its path. By this, embodiments of the present invention differ substantially from traditional volume reduction methods implemented in communication network. In the traditional networks the data flow rate is determined at its source only and remains constant along the flow. Embodiments of the present invention allow decreasing variations of the data flow rate in various sections along the flow. In other words, the flow rate is a monotonically decreasing function of the location downstream along each flow.

Consistent with some embodiments of the present invention, at least some of the nodes at the communication network are associated with a plurality of applications, wherein some of the applications reside on at least some of the nodes, and wherein each application over a node provides its own specification of the gain it achieves from usages of the data arriving to the node from each flow, according to the quality of the data.

Consistent with some embodiments of the present invention, the data quality at a specific node is a ratio between a flow rate arriving at the specific node and the initial flow rate associated with a respective source of the specific node.

Consistent with some embodiments of the present invention, the overall revenue is calculated under restrictions being at least one of: (i) compliance with bandwidth requirements of the communication network; and (ii) latency of data flowing in the communication network.

Consistent with some embodiments of the present invention, the overall revenue is calculated as a sum of the revenues of each node, the revenue of a node being the product between its gain and the data quality of the data that arrives to the given node for each flow.

Consistent with some embodiments of the present invention, the optimal bandwidth link allocation is carried out taking into account: (a) specified locations where a flow rate is reduced and (b) amounts of flow reduction in the specified locations.

Figure 3:
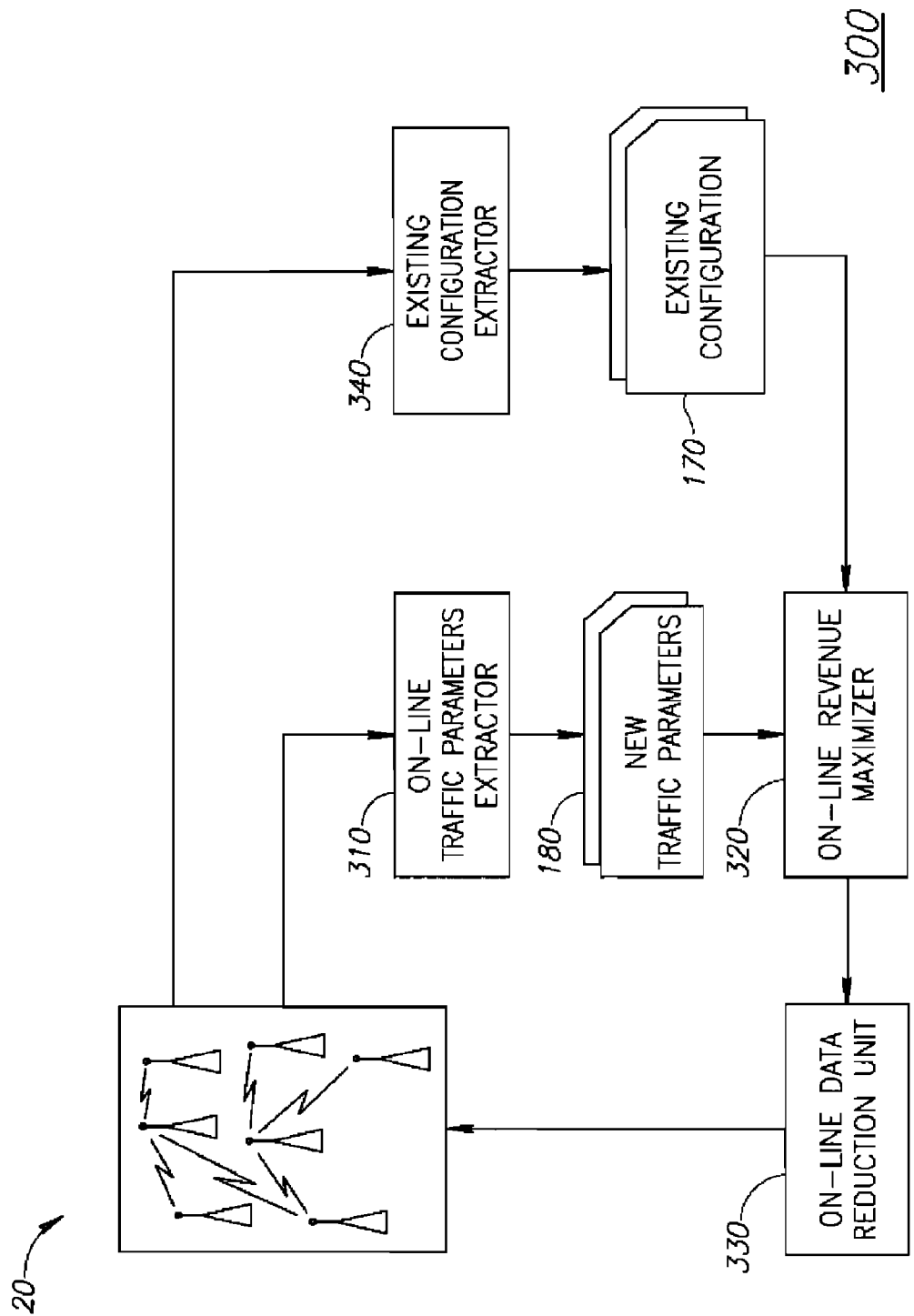
FIG. 3 is a high level schematic block diagram illustrating another aspect of the system according to some embodiments of the invention.

FIG. 3 is a block diagram illustrating a system according to other embodiments of the invention. System 300 may be operated during the run-time phase, in which flows can be added dynamically when the communication network 20 is alive. The new flow is generated and transmitted within an existing configuration, and thus system 300 needs to optimize the data reduction with the existing configuration 170 considered as initial conditions of the data reduction optimization problem. The existing configuration 170 may include a list of the existing flows with their sources identification, the sequences of nodes defining their paths, their initial flow rates and reduced rates, or data reduction ratios, along their path. Additional input parameters may be new traffic parameters 180 being input parameters for the new flows including per each flow its source and target nodes, its initial rate and its quality gain at each node along its path. The new traffic parameters are provided via the on-line traffic parameters extractor 310. It is noted that the gains as well as the initial flow rates may change dynamically over time in communication network 20.

Additionally, system 300 further includes an on-line revenue maximizer 320 that uses both new traffic parameters 180 and the existing configuration 170, to calculate an updated value of data reduction ratio for each one of the nodes. The on-line revenue maximizer 320 calculates optimally the volume reduction for the newly added flows. It also may preempt previously assigned rates to the existing flows by further reducing their volumes at certain nodes. The goal is to achieve an optimal network utilization and maximum revenue. In order to implement a quality aware on-line data reduction for the new flows as well as for the existing flows, system 300 utilizes existing configuration data 170 that has been calculated previously, possibly by revenue maximize 150, based on quality gain 132, model 120, and traffic parameters 142 as explained above, or by similar means such as existing configuration extractor 340 being in direct communication with network 20.

The respective updated reduction ratios are then used by on-line data reduction unit 330 to apply the data reduction to the respective node in real-time for each flow, without interfering with the regular operation of active communication network 20 The actual reduction is again, beyond the scope of the present invention and may be implemented by data reduction mechanisms known in the art.

Consistent with some embodiments of the present invention, online revenue maximizer 320 is further configured to carry out the calculation of the updated data reduction ratios after each change out under a constraint such that a flow currently transmitted through the communication network and reduced along its path as defined by a previous calculation is only further reduced by each node along its path.

Figure 4:
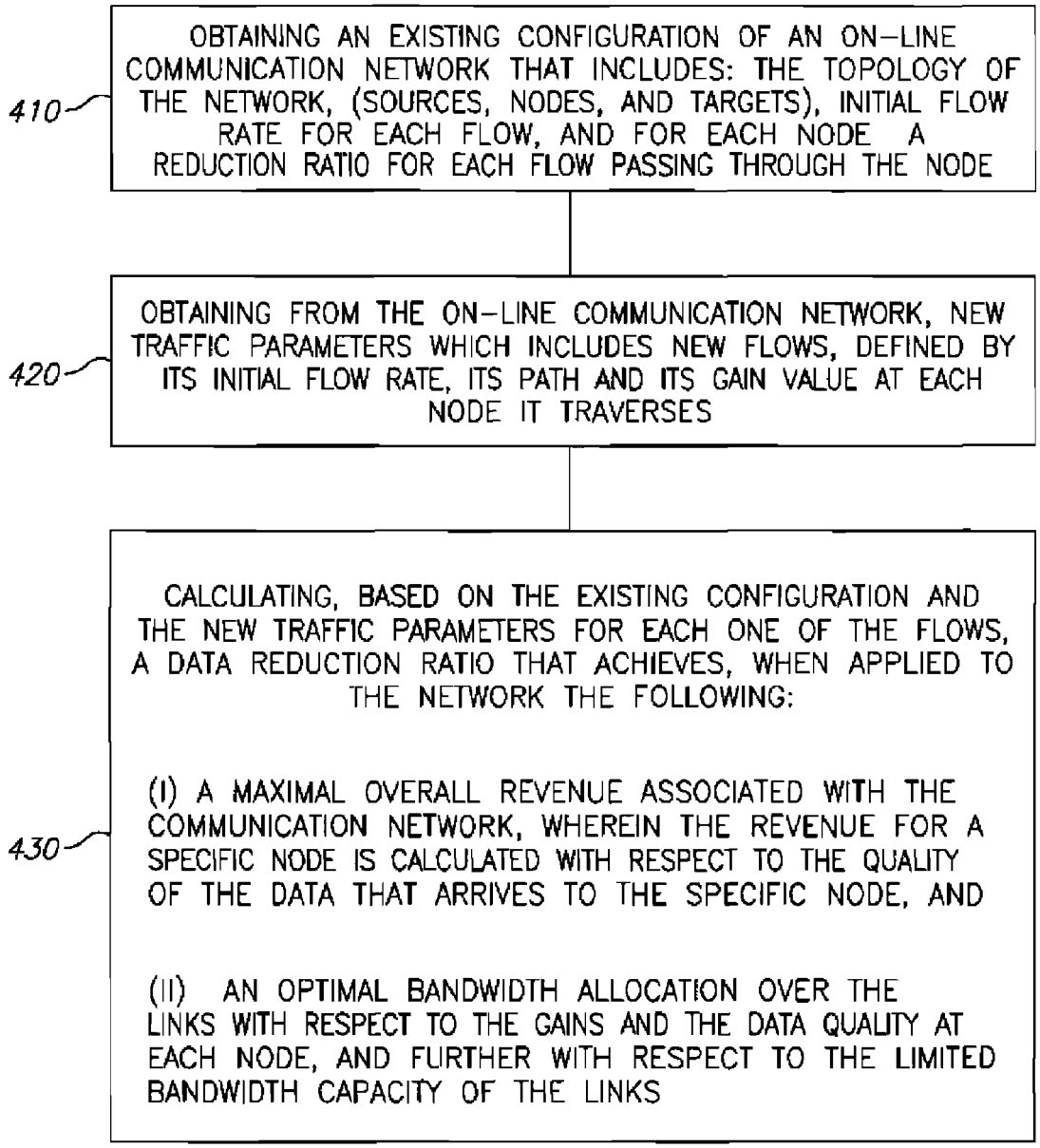
FIG. 4 is a high level flowchart illustrating another aspect of the method according to some embodiments of the invention.

FIG. 4 is a high level flowchart illustrating another aspect of the method according to some embodiments of the invention. Method 400 carries out a quality aware data reduction in an active (on-line) communication network. In an exemplary embodiment, the method may be implements as follows. The method starts with obtaining as input,: new traffic parameters relating to new flows including the initial flow rates of the new flows and the reduction ratios along their paths 410. The method goes on (or performs concurrently) to obtaining from a live communication network an existing configuration that includes a data reduction ratio for each flow and each one of the nodes in the system prior to the addition or change in the flows 420. Finally, the method proceeds to the stage of calculating, based on the existing configuration and the new traffic parameters, for each one of the nodes and for each flow passing through the node, a data reduction ratio, such that the data reduction ratio achieves, when applied to the communication network: (i) a maximal overall revenue associated with the communication network, wherein the revenue for a specific node is calculated with respect to the quality of the data that arrives to the specific node from each flow passing through the node, and (ii) an optimal bandwidth allocation over the links with respect to the gains from the data quality at each node, and further with respect to the limited bandwidth capacity of the links 430.

Advantageously, the on-line embodiment of the present invention enables to carry out quality aware data reduction on active communication networks, without the need to shut them down and analyze their parameters. The prerequisite for the on-line embodiment however is that the existing configuration of the instance prior to the addition or change in the flows is provided as an input.

Figure 5:
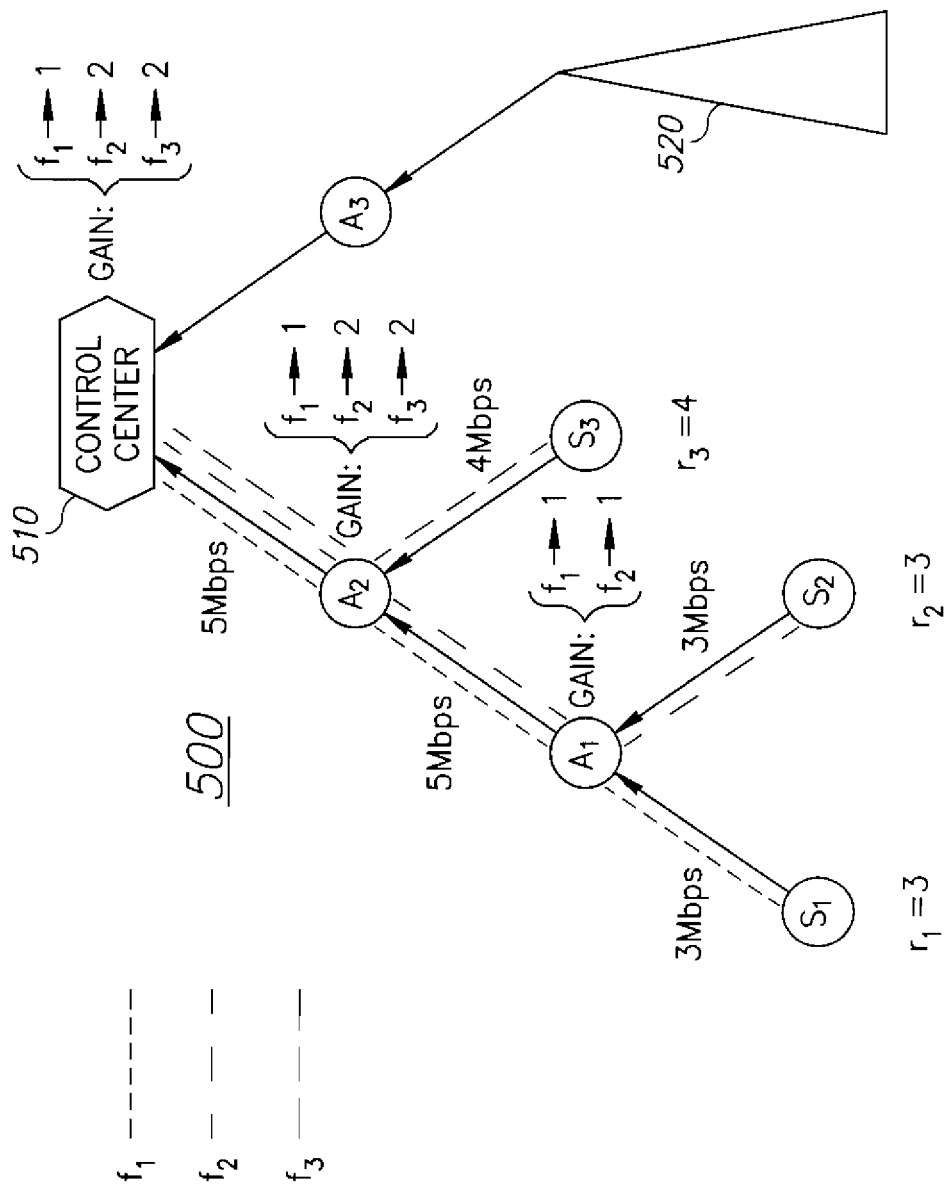
FIG. 5 is a diagram illustrating an aspect according to some embodiments of the invention.

FIG. 5 is a diagram of a non-limiting example illustrating how the quality-aware volume reduction is being carried out according to some embodiments of the invention. Graph 500 shows three flows f1, f2, and f3 originating from sources s1, s2, and s3 respectively towards the control center 510, and having each an initial flow rate r1, r2, and r3 respectively. Sub network 520 represents a non detailed part of the network that further includes sources and nodes and flows through node A3 to control center 510. In accordance with the detailed description above, quality gains of the inner nodes A1, A2, A3, and control center 510 may be derived as inputs and the volume reduction computation takes these values into account. Specifically, the quality gain for node A1 from each flow; are as follows: 1 for flow f1 and 1 for flow f2; the gains of A2 from each flow are 1 for flow f1; 2 for flow f2; and 2 for flow f3; and the gains of control center 510 from each flow are 1 for flow 1; 2 for flow f2; and 2 for flow 3. The optimal overall revenue is achieved as follows. The integral flow f2 is routed up to the control center 510, and thus ,the quality of flow f2 for A2 is the same as the quality of flow f2 at control center 510 , being 1. Hence, the total revenue achieved from f2 is the sum of products of the gain of flow f2 at A2 and control center 510 and the respective quality of data. Hence revenue of flow f2 is 1*1+2*2+2*2=5. Flow f1 is reduced both by A1 and A2, where A1 reduces a value of 1 and A2 reduces a value of 2, and thus, the quality of flow f1 at A1 is 1, the quality of flow f1 at A2 is 2/3, and the quality of flow f1 at control center 510 is 1. Thus, the total revenue achieved from flow f1 is 1*1+1*2/3+1*0=5/3. A volume of from flow f3 is reduced by A2, and thus, the quality of flow 3 at A1 is 1 and the quality of flow 3 at control center 510 is 1/2. The total revenue achieved from flow f3 is thus 2*1+2*1/2=3. Therefore, adding up the revenues of all flows yielding the overall revenue of the system being 5+5/3+3.

The aforementioned example illustrates a fundamental aspect of the present invention according to which the flows may (but not necessarily) have different flow rates along their paths. As shown above, data reduction is carried out on an ad hoc basis in the various nodes thus bringing together two desirable outcomes of the present invention: the first being supplying the needs of a certain quality of data of a specific node, and the other being freeing bandwidth resources further along the path by reducing the data at a specific node. Advantageously, by using information about the gain of all nodes in the network, both outcomes may be optimized. As illustrated above, the optimization may be carried out both in the off-line case and the on-line case.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   deriving, from a communication network that contains: one or more sources, nodes, and one or more targets, all connected via directed links:
   (i) a bandwidth capacity limit associated with each one of the links, and
   (ii) an initial flow rate that is transmitted by each one of the sources towards the targets via the nodes;
   obtaining as an input, from each one of the nodes, a gain value which corresponds to a quantitative data demand requested by the node for each flow passing through the node, wherein the quantitative data demand is given in terms of data quality and relates to data that arrives to the node from each flow; and
   calculating, for each one of the nodes and for each flow passing through the node, a data reduction ratio, such that the data reduction ratio achieves, when applied to the communication network:
   (i) a maximal overall revenue associated with the communication network, wherein the revenue for a specific node is calculated with respect to the quality of the data that arrives to the specific node, and
   (ii) an optimal bandwidth allocation over the links with respect to the gains from the data quality at each node, and further with respect to the limited bandwidth capacity of the links.

2. The method according to claim 1, wherein the deriving is carried out by modeling the communication network into a directed acyclic graph and wherein the calculating of the revenues is carried out based on the graph.

3. The method according to claim 1, wherein for each one of the nodes, the revenue is calculated as a product of the data quality and its respective gain value.

4. The method according to claim 1, wherein a flow is a directed transfer of data originating from a same source via a single path along nodes towards a target, and wherein the optimal bandwidth allocation is carried out by allocating different flow rates to various sections of each flow along its path, following the volume reductions performed over the flow by different nodes along its path.

5. The method according to claim 4, wherein the optimal bandwidth allocation is carried out achieving optimal bandwidth link allocation throughout the communication network, taking into account: (a) specified locations where a flow rate is reduced and (b) amounts of flow reduction in the specified locations.

6. The method according to claim 4, wherein the communication network is operating online such that the initial flow rates at the sources and the quality gains of the nodes are dynamically changing over time and wherein the calculating of the data reduction ratio for each node is carried out based on: (i) previously calculated data reduction ratios provided as initial conditions, (ii) the dynamically changing initial flow rates at the sources, and (iii) the dynamically changing quality gains of the nodes.

7. The method according to claim 6, wherein the calculating after each change is carried out under a constraint according to which, a flow currently transmitted through the communication network and reduced along its path as defined by the previous reduction rates is only further reduced by each node along the path of the flow.

8. The method according to claim 1, wherein at least some of the nodes at the communication network are associated with a plurality of applications, wherein some of the applications reside on at least some of the nodes, and wherein each application over a node provides its own specification of the gain it achieves from a usages of the data arriving to the node, according to the quality of the data.

9. The method according to claim 1, wherein the data quality at a specific node is a ratio between a flow rate arriving at the specific node and the initial flow rate associated with a respective source of the specific node.

10. The method according to claim 1, wherein the overall revenue is calculated under restrictions being at least one of: (i) compliance with bandwidth requirements of the communication network; and (ii) latency of data flowing in the communication network.

11. The method according to claim 1, wherein the overall revenue is calculated as a sum of the revenues of each node, the revenue of a node being the product between its gain and the data quality of the data that arrives to the given node.

12. A system comprising:
  a traffic parameters extractor configured to extract traffic parameters, from a communication network that contains: one or more sources, nodes, and one or more targets, all connected via directed links, wherein the communication traffic parameters includes:
    (i) a bandwidth capacity limit associated with each one of the links, and
    (ii) an initial flow rate that is transmitted by the sources towards the targets via the nodes;
  a quality gain determiner configured to obtain as an input, from each one of the nodes, a gain value which corresponds to a quantitative data demand requested by the node, wherein the quantitative data demand is given in terms of data quality and relates to data that arrives to the node; and
  a revenue maximizer configured to calculate, for each one of the nodes, a data reduction ratio, such that the data reduction ratio achieves, when applied to the communication network:
    (i) a maximal overall revenue associated with the communication network, wherein the revenue for a specific node is calculated with respect to the quality of the data that arrives to the specific node, and
    (ii) an optimal bandwidth allocation over the links with respect to the gains from the data quality at each node, and further with respect to the limited bandwidth capacity of the links.

13. The system according to claim 12, further comprising a modeler configured to generate a model of the communication network in a form of a directed acyclic graph and wherein the traffic parameters extractor is configured to extract the traffic parameters and the quality gain determiner configured to obtain the quality gain, based on the model.

14. The system according to claim 13, wherein a flow is a directed transfer of data originating from a same source via a single path along nodes towards a target, and wherein the optimal bandwidth allocation is carried out by allocating different flow rates to various sections of each flow along its path, following the volume reductions performed over the flow by different nodes along its path.

15. The system according to claim 14, wherein the optimal bandwidth link allocation is carried out taking into account: (a) specified locations where a flow rate is reduced and (b) amounts of flow reduction in the specified locations.

16. The system according to claim 14, wherein the communication network is operating online such that the initial flow rates at the sources and the quality gains of the nodes are dynamically changing over time and wherein the revenue maximizer is configured to calculate of the data reduction ratio for each node based on: (i) previously calculated data reduction ratios as initial conditions, (ii) the dynamically changing initial flow rates at the sources, and (iii) the dynamically changing quality gains of the nodes.

17. The system according to claim 16, wherein the revenue maximizer carries out the calculation after each change out under a constraint such that a flow currently transmitted through the communication network and reduced along its path as defined by previous calculation is only further reduced by each node along its path.

18. The system according to claim 12, wherein for each one of the nodes, the revenue is calculated as a product of the data quality and its respective gain value.

19. The system according to claim 12, wherein at least some of the nodes at the communication network are associated with a plurality of applications, wherein some of the applications reside on at least some of the nodes, and wherein each application over a node provides its own specification of the gain it achieves from a usages of the data arriving to the node for each flow passing through the node, according to the quality of the data.

20. The system according to claim 12, wherein the data quality at a specific node is a ratio between a flow rate arriving at the specific node and the initial flow rate associated with a respective source of the specific node.

21. The system according to claim 12, wherein the overall revenue is calculated under restrictions being at least one of: (i) compliance with bandwidth requirements of the communication network; and (ii) latency of data flowing in the communication network.

22. The system according to claim 12, wherein the overall revenue is calculated as a sum of the revenues of each node, the revenue of a node being the product between its gain and the data quality of the data that arrives to the given node.

23. A computer program product, the computer program product comprising:
  a non-transitory computer readable storage medium having computer readable program embodied therewith, the computer readable program comprising:
  computer readable program configured to extract traffic parameters from a communication network that contains: one or more sources, nodes, and one or more targets, all connected via directed links, wherein the communication traffic parameters includes:
    (i) a bandwidth capacity limit associated with each one of the links, and
    (ii) an initial flow rate that is transmitted by the sources towards the targets via the nodes;
  computer readable program configured to obtain as an input, from each one of the nodes and for each flow passing through the node, a gain value which corresponds to a quantitative data demand requested by the node for each flow, wherein the quantitative data demand is given in terms of data quality and relates to data that arrives to the node; and computer readable program configured to calculate, for each one of the nodes, a data reduction ratio, such that the data reduction ratio achieves, when applied to the communication network:

(i) a maximal overall revenue associated with the communication network, wherein the revenue for a specific node is calculated with respect to the quality of the data that arrives to the specific node, and (ii) an optimal bandwidth allocation over the links with respect to the gains from the data quality at each node, and further with respect to the limited bandwidth capacity of the links.

24. The computer program product according to claim 23, wherein the communication network is operating online, such that the initial flow rates at the sources and the quality gains of the nodes are dynamically changing over time and wherein the computer readable program configured to calculate the data reduction ratio for each one of the nodes and each flow, bases the calculation on: (i) previously calculated data reduction ratios as initial conditions, (ii) the dynamically changing initial flow rates at the sources, and (iii) the dynamically changing quality gains of the nodes.

* * * * *